US010227421B2

(12) United States Patent
Jasiunas et al.

(10) Patent No.: US 10,227,421 B2
(45) Date of Patent: Mar. 12, 2019

(54) CHEMICALLY FUNCTIONALIZED RENEWED RUBBER COMPOSITION

(71) Applicant: Lehigh Technologies, Inc., Tucker, GA (US)

(72) Inventors: Chad Aaron Jasiunas, Copley, OH (US); Frank P. Papp, Fort Mill, SC (US); Charles T. Rosenmayer, Decatur, GA (US); Adel Farhan Halasa, Akron, OH (US)

(73) Assignee: Lehigh Technologies, Inc., Tucker, GA (US)

(*) Notice: Subject to any disclaimer, the term of this patent is extended or adjusted under 35 U.S.C. 154(b) by 80 days.

(21) Appl. No.: 15/399,125

(22) Filed: Jan. 5, 2017

(65) Prior Publication Data
US 2017/0114155 A1    Apr. 27, 2017

Related U.S. Application Data

(62) Division of application No. 14/694,447, filed on Apr. 23, 2015, now Pat. No. 9,574,069.
(Continued)

(51) Int. Cl.
*C08C 19/22* (2006.01)
*C08K 5/43* (2006.01)
(Continued)

(52) U.S. Cl.
CPC ............... *C08C 19/22* (2013.01); *B60C 1/00* (2013.01); *B60C 1/0016* (2013.01); *C08C 19/08* (2013.01);
(Continued)

(58) Field of Classification Search
None
See application file for complete search history.

(56) References Cited

U.S. PATENT DOCUMENTS 2,867,540 A * 1/1959 Harris ............... C09C 1/56
106/476
3,884,285 A * 5/1975 Russell ............. B60C 1/0016
152/209.5

(Continued)

FOREIGN PATENT DOCUMENTS

WO    WO 2014042510    3/2014

OTHER PUBLICATIONS

Preparation of Rubber Composite from Ground Tire Rubber Reinforced with Waste-Tire Fiber Through Mechanical Milling, Zhang et al., Journal of Applied Polymer Science, vol. 103, 4087-4094, 2007 (Year: 2007).*

(Continued)

*Primary Examiner* — Peter A Salamon
(74) *Attorney, Agent, or Firm* — Dority & Manning, P.A.

(57) ABSTRACT

The renewed rubber of this invention can be used in rubber formulations that are used in manufacturing a wide array of rubber products, including tires, power transmission belts, conveyor belts, hoses, and a wide array of other products. The present invention more specifically discloses a method for manufacturing an environmentally friendly, chemically functionalized, renewed rubber composition having a highly desirable combination of physical properties and which exhibits excellent processability comprising the steps of (1) blending a micronized rubber powder with a processing aid and a chemical functionalizing agent to produce a blended mixture; (2) processing the blended mixture under conditions of high shear and low temperature to produce a reacted mixture; (3) adding a stabilizer to the reacted mixture to produce the chemically functionalized renewed rubber composition.

20 Claims, 2 Drawing Sheets

Related U.S. Application Data

(60) Provisional application No. 61/986,696, filed on Apr. 30, 2014, provisional application No. 62/063,801, filed on Oct. 14, 2014, provisional application No. 62/105,024, filed on Jan. 19, 2015.

(51) Int. Cl.

| | | |
|---|---|---|
| *C08K 5/31* | (2006.01) | |
| *C08L 9/06* | (2006.01) | |
| *B60C 1/00* | (2006.01) | |
| *C08C 19/08* | (2006.01) | |
| *C08J 11/28* | (2006.01) | |
| *C08L 19/00* | (2006.01) | |
| *C08K 3/04* | (2006.01) | |
| *C08K 5/09* | (2006.01) | |
| *C08K 5/40* | (2006.01) | |
| *C08K 5/435* | (2006.01) | |
| *C08L 9/00* | (2006.01) | |
| *C08L 17/00* | (2006.01) | |
| *C08L 91/00* | (2006.01) | |
| *B60C 9/00* | (2006.01) | |
| *C08K 3/22* | (2006.01) | |

(52) U.S. Cl.
CPC ............. *C08J 11/28* (2013.01); *C08K 3/04* (2013.01); *C08K 5/09* (2013.01); *C08K 5/31* (2013.01); *C08K 5/40* (2013.01); *C08K 5/43* (2013.01); *C08K 5/435* (2013.01); *C08L 9/00* (2013.01); *C08L 9/06* (2013.01); *C08L 17/00* (2013.01); *C08L 19/003* (2013.01); *C08L 91/00* (2013.01); *B60C 2009/0021* (2013.01); *C08J 2319/00* (2013.01); *C08J 2321/00* (2013.01); *C08K 2003/2296* (2013.01); *C08L 2201/08* (2013.01); *C08L 2205/02* (2013.01); *C08L 2205/025* (2013.01); *C08L 2205/03* (2013.01); *C08L 2205/06* (2013.01); *C08L 2207/24* (2013.01); *Y02T 10/862* (2013.01); *Y02W 30/706* (2015.05)

(56) References Cited

U.S. PATENT DOCUMENTS

| | | | | |
|---|---|---|---|---|
| 3,994,742 | A * | 11/1976 | Russell | B60C 1/0016 106/491 |
| 4,104,205 | A * | 8/1978 | Novotny | C08J 3/28 264/489 |
| 4,550,135 | A * | 10/1985 | Iwama | B60C 1/0016 524/495 |
| 4,954,382 | A * | 9/1990 | Riefler | B29C 70/086 428/116 |
| 5,087,500 | A * | 2/1992 | Kasper | B32B 3/12 428/116 |
| 5,214,100 | A * | 5/1993 | Abele | C08G 61/02 152/547 |
| 5,238,725 | A * | 8/1993 | Effing | B29B 13/023 428/116 |
| 5,284,625 | A * | 2/1994 | Isayev | B01J 19/10 422/128 |
| 5,294,663 | A * | 3/1994 | Fabris | B60C 1/0016 524/526 |
| 5,602,186 | A * | 2/1997 | Myers | C08J 11/16 521/41 |
| 5,744,552 | A * | 4/1998 | D'Sidocky | C08K 3/30 524/419 |
| 5,770,632 | A * | 6/1998 | Sekhar | C08J 11/28 521/41.5 |
| 6,541,526 | B1 * | 4/2003 | Goldshtein | B29B 17/0404 521/41 |
| 6,548,560 | B1 * | 4/2003 | Kovalak | C08J 11/22 521/41 |
| 6,831,109 | B1 * | 12/2004 | Beirakh | C08J 11/28 521/41 |
| 6,924,319 | B1 * | 8/2005 | Alsdorf | C08J 11/10 521/40 |
| 2002/0121714 | A1 * | 9/2002 | Preisler | B29C 45/14 264/46.4 |
| 2005/0176852 | A1 * | 8/2005 | Okel | B82Y 30/00 523/216 |
| 2007/0032593 | A1 * | 2/2007 | Yagi | B60C 1/00 524/575.5 |
| 2010/0261025 | A1 * | 10/2010 | Miyamoto | B29C 45/14311 428/458 |
| 2010/0317752 | A1 * | 12/2010 | Sekhar | C08J 11/28 521/40 |
| 2011/0250384 | A1 * | 10/2011 | Sumi | B60R 5/044 428/118 |
| 2012/0252954 | A1 * | 10/2012 | Grun | C08J 3/203 524/447 |
| 2012/0316283 | A1 * | 12/2012 | Rosenmayer | B32B 5/16 524/526 |
| 2014/0088258 | A1 * | 3/2014 | Papp | C08L 17/00 525/236 |
| 2014/0128535 | A1 * | 5/2014 | Rosenmayer | C08J 11/28 524/526 |
| 2014/0205848 | A1 * | 7/2014 | Fujiki | B60C 11/02 428/492 |
| 2015/0182811 | A1 * | 7/2015 | Bender | A63B 45/00 473/376 |
| 2015/0315363 | A1 * | 11/2015 | Jasiunas | C08K 5/43 523/156 |
| 2016/0152805 | A1 * | 6/2016 | Jasiunas | C08K 5/435 152/548 |

OTHER PUBLICATIONS

Yamashita S., "Reclaimed Rubber From Rubber Scrap", International Polymer Science and Technology, RAPRA Technology, Shrewabury, GB, vol. 8, No. 12, Jan. 1, 1981, pp. T/77-T/93.

* cited by examiner

CHEMICALLY FUNCTIONALIZED RENEWED RUBBER COMPOSITION

This is a divisional of U.S. patent application Ser. No. 14/694,447, filed on Apr. 23, 2015, which claims the benefit of U.S. Provisional Patent Application Ser. No. 61/986,696 filed on Apr. 30, 2014, U.S. Provisional Patent Application Ser. No. 62/063,801 filed on Oct. 14, 2014, and U.S. Provisional Patent Application Ser. No. 62/105,024 filed on Jan. 19, 2015, is claimed hereby. The teachings of U.S. patent application Ser. No. 14/694,447, U.S. Provisional Patent Application Ser. No. 61/986,696, U.S. Provisional Patent Application Ser. No. 62/063,801, and U.S. Provisional Patent Application Ser. No. 62/105,024 are incorporated herein by reference in their entirety.

FIELD OF THE INVENTION

The present invention relates generally to methods of using reclaimed cross-linked elastomeric material (thermoset polymers) and, in particular, to methods of chemical functionalization of reclaimed elastomeric materials, such as micronized rubber powder and to elastomer compounds and compositions comprising the chemically functionalized elastomeric materials.

BACKGROUND OF THE INVENTION

Millions of used tires, hoses, belts and other rubber products are discarded annually after they have been worn-out during their limited service life. These used rubber products are typically hauled to a dump or burnt as fuel because there is very little use for them after they have served their original intended purpose. A limited number of used tires are utilized in building retaining walls, as guards for protecting boats and similar things where resistance to weathering is desirable. Some tires are ground into powder form to be used in various applications, such as tire compounds, binders for asphalt, mulch and sports field applications, to name a few. However, a far greater number of tires, hoses and belts are simply discarded or burnt.

The recycling of cured rubber products has proven to be an extremely challenging problem. This problem associated with recycling cured rubber products (such as, tires, hoses and belts) arises because, in the vulcanization process, the rubber becomes crosslinked with sulfur. The sulfur cross-links are very stable and the vulcanization process is extremely difficult to reverse. After vulcanization, the cross-linked rubber becomes thermoset and cannot easily be reformed into other products. In other words, the cured rubber cannot be melted and reformed into other products like metals or thermoplastic materials. Thus, cured rubber products cannot be simply melted and easily recycled into new products.

Since the discovery of the rubber vulcanization process by Charles Goodyear in the nineteenth century, there has been interest in the recycling of cured rubber. A certain amount of cured rubber from tires and other rubber products is shredded or ground to a small particle size and incorporated into various products as a type of filler. For instance, ground rubber can be incorporated into asphalt for surfacing roads or parking lots. Small particles of cured rubber can also be included in rubber formulations for new tires and other rubber products. However, it should be understood that the recycled rubber serves only in the capacity of a filler because it was previously cured and does not bond to an appreciable extent to the virgin rubber in the rubber formulation. Therefore, recycled rubber is typically limited to lower loadings due to poor compound processing (compounds become more viscous with higher loadings) as well as higher loadings leading to unacceptable cure properties.

Various techniques for devulcanizing cured rubber have been developed. Devulcanization offers the advantage of rendering the rubber suitable for being reformulated and recurred into new rubber articles if it can be carried out without degradation of the rubber. In other words, the rubber could again be used for its original intended purpose. However, none of the devulcanization techniques previously developed has proven to be commercially viable at high loadings. For example, some devulcanized materials may be used at loadings of 3-5%. However, above this level the properties of the new rubber article are diminished. This is unsuitable for high performance applications, such as rubber compounds for vehicle tires. In other cases, the devulcanized materials are unsuitable for processing at high loadings into rubber compounds. These processing challenges can include short cure times (scorch), too little tack, too high viscosity, and poor mill handling and extrusion quality. A renewable material that can be used in high performance applications at loadings of 5% and higher is needed.

U.S. Pat. No. 4,104,205 discloses a technique for devulcanizing sulfur-vulcanized elastomer containing polar groups which comprises applying a controlled dose of microwave energy of between 915 MHz and 2450 MHz and between 41 and 177 watt-hours per pound in an amount sufficient to sever substantially all carbon-sulfur and sulfur-sulfur bonds and insufficient to sever significant amounts of carbon-carbon bonds.

U.S. Pat. No. 5,284,625 discloses a continuous ultrasonic method for breaking the carbon-sulfur, sulfur-sulfur and, if desired, the carbon-carbon bonds in a vulcanized elastomer. Through the application of certain levels of ultrasonic amplitudes in the presence of pressure and optionally heat, it is reported that cured rubber can be broken down. Using this process, the rubber becomes soft, thereby enabling it to be reprocessed and reshaped in a manner similar to that employed with previously uncured elastomers.

U.S. Pat. No. 5,602,186 discloses a process for devulcanizing cured rubber by desulfurization, comprising the steps of: contacting rubber vulcanizate crumb with a solvent and an alkali metal to form a reaction mixture, heating the reaction mixture in the absence of oxygen and with mixing to a temperature sufficient to cause the alkali metal to react with sulfur in the rubber vulcanizate and maintaining the temperature below that at which thermal cracking of the rubber occurs, thereby devulcanizing the rubber vulcanizate. U.S. Pat. No. 5,602,186 indicates that it is preferred to control the temperature below about 300° C., or where thermal cracking of the rubber is initiated. Toluene, naphtha, terpenes, benzene, cyclohexane, diethyl carbonate, ethyl acetate, ethylbenzene, isophorone, isopropyl acetate, methyl ethyl ketone and derivatives thereof are identified as solvents that can be used in the process disclosed by this patent.

U.S. Pat. No. 6,548,560 is based upon the discovery that cured rubber can be devulcanized by heating it to a temperature of at least about 150° C. under a pressure of at least about $3.4 \times 10^6$ Pascals in the presence of a solvent selected from the group consisting of alcohols and ketones having a critical temperature within the range of about 200° C. to about 350° C. The molecular weight of the rubber can be maintained at a relatively high level if the devulcanization is carried out at a temperature of no more than about 300° C. This devulcanization technique is reported to not significantly break the polymeric backbone of the rubber or to change its microstructure. In other words, the devulcanized rubber can be recompounded and recurred into useful articles in substantially the same way as was the original (virgin) rubber. This patent more specifically reveals a process for devulcanizing cured rubber into devulcanized rubber that is capable of being recompounded and recurred into useful rubber products, said process comprising (1) heating the cured rubber to a temperature which is within the range of about 150° C. to about 300° C. under a pressure of at least about $3.4 \times 10^6$ Pascals in the presence of a solvent selected from the group consisting of alcohols and ketones, wherein said solvent has a critical temperature which is within the range of about 200° C. to about 350° C., to devulcanize the cured rubber into the devulcanized rubber thereby producing a slurry of the devulcanized rubber in the solvent; and (2) separating the devulcanized rubber from the solve.

U.S. Pat. No. 5,770,632 discloses a process for reclaiming elastomeric material from elemental sulphur-cured elastomeric material having a vulcanized network without using hexamethylene tetramine, by treating the sulphur-cured elastomeric material having a vulcanized network with one or more rubber delinking accelerators selected from the group of zinc salts of thiocarbamates and zinc salts of dialkyl dithiophosphates, 2-mercaptobenzothiazole or derivatives thereof, thiurams, guanidines, 4,4'-dithiomorpholine and sulphenamides, and a zinc oxide activator in an amount sufficient to act as an activator for the accelerator(s) to delink the elastomeric material at a temperature below 70° C., whereby the vulcanized network is opened up or delinked to provide a curable reclaimed elastomeric material capable of being vulcanized without adding rubber vulcanizing chemicals. The technique described in this patent also includes compositions capable of delinking the vulcanized network of sulphur-cured elastomeric materials including the accelerators and activator described above. The obtained recycled, or reclaimed, elastomeric material has desired physical and dynamic characteristics that render it suitable for use in molded goods or for admixture with fresh compounds in tires and related products.

U.S. Pat. No. 6,831,109 described a modifier for devulcanization of cured elastomers, and especially vulcanized rubber, said modifier containing a first chemical substance, which is disposed towards on and the formation of an organic cation and amine, and further containing a second chemical substance as promoter of dissociation of the first chemical substance, said promoter containing a functional group constituting an acceptor of said amine.

U.S. Pat. No. 6,541,526 describes a mechanical/chemical method composition for the de-vulcanization of rubber is reported to maintain the macromolecules in the composition and to render the sulfur therein passive for later re-vulcanization. This process is also reported to be cost effective, environmentally friendly and to produce high quality de-vulcanized rubber to replace virgin rubber. According to the method of U.S. Pat. No. 6,541,526 waste rubber is shredded, crushed and metal is removed. Then the modifying composition is added as the particles of shredded waste rubber are poured between two rollers that further crush the particles. The modifying composition is a mixture of ingredients which include, by weight, the following components: (1) between approximately 76% and approximately 94% of a proton donor that breaks sulfur to sulfur bonds in the waste rubber; (2) between approximately 1% and approximately 5% of a metal oxide, (3) between approximately 1% and approximately 5% of an organic acid having between 16 and 24 carbon atoms per molecule, (4) between approximately 2% and approximately 10% of a vulcanization inhibitor and (5) between approximately 2% and approximately 10% of a friction agent.

United States Patent Application Publication No. 2010/0317752 described a method which is reported to be effective in recycling vulcanized elastomeric materials via a cost effective devulcanization process which opens up or "delinks" the crosslinks of the vulcanized network structure in used vulcanized elastomers without unduly degrading the backbone of the rubbery polymer. This patent more specifically discloses a delinking composition in the form of a combined solid dose comprising: (i) one or more elastomer delinking accelerators selected from the group consisting of zinc salts of thiocarbamates and zinc salts of dialkyl dithiophosphates; and (ii) one or more elastomer delinking accelerators selected from the group consisting of 2-mercaptobenzothiazole or derivatives thereof, thiurams, guanidines, 4,4'-dithiomorpholine and sulpenamides; and (iii) at least one elastomer delinking activator. However, this patent absolutely requires as essential ingredients zinc salt, an elastomer delinking accelerator and a delinking activator.

Accordingly, these foregoing patents have not proven to be commercially viable and the recycled rubber made by these processes have not proven to be feasible for use at high loadings in demanding applications, such as certain rubber compounds for vehicle tires. To date very little characterization data has been presented to substantiate the statements regarding the selectivity of sulfur-sulfur or sulfur-carbon bonds being broken instead carbon-carbon bonds within the vulcanized rubber compound network.

Cured rubber articles can also be ground into a powder and used in manufacturing a wide variety of products. Reclaimed elastomeric materials, such as reclaimed elastomers, ground tire rubber (GTR), and micronized rubber powders (MRP), which include vulcanized elastomeric materials, are used in a variety of products. For instance, micronized rubber powders are commonly used as fillers in rubber, asphalt, and plastic articles. More specifically, micronized rubber powders are presently being utilized as fillers in tires, industrial rubber products (hoses, power transmission belts, conveyor belts, floor mats), asphalt products (paving formulations and roofing shingles) and a wide array of other products. The utilization of reclaimed elastomers in such rubber products is typically significantly less expensive than using virgin materials and leads to an overall reduction in manufacturing costs. The use of reclaimed material is also environmentally advantageous in that it prevents the cured rubber recovered from postconsumer and industrial sources from going to landfills or simply being burned. Finally, the use of recycled ground tire rubber and micronized rubber powders provides a strategic supply chain hedge against petroleum-based supply chain price and supply volatility.

Today devulcanized rubber material known as reclaim exhibits excellent processability but poor cure properties in compounds at loadings above 3-5%. Micronized rubber powder (MRP) shows acceptable cure properties, yet at higher loadings (above 5%), compound processability begins to suffer.

Generally, ground tire rubber (GTR) consists of particle size distributions that range from a diameter of about 0.5 mm to about 5 mm which can be produced by a variety of techniques including ambient temperature and cryogenic grinding methods. Micronized rubber powders (MRP) typically contain a significant fraction of rubber particles having a particle size of less than 100 microns. In any case, ground tire rubber and micronized rubber powders are commonly designated by mesh size. For example, powders in the size range of 10-30 mesh normally are considered to be ground tire rubber while powders having a smaller particle size which is within the range of 40-300 mesh are generally considered to be micronized rubber powder. Micronized rubber powder is typically more expensive to make by virtue of requiring more processing and/or more demanding processing conditions to attain the smaller particle size. For this reason, ground tire rubber is typically used in low performance applications, such as floor mats, with micronized rubber powder only being utilized in more demanding applications, such as tires, where the additional cost can be justified.

The reclaimed elastomeric polymers which are used as the raw material for making ground tire rubber and micronized rubber powder, such as scrap tire rubber, are cured (previously vulcanized) rubbers. They are accordingly relatively inert particles which are essentially non-reactive with virgin elastomers, which results in compromised processing and properties at high loadings.

There has been a long-felt but unresolved need for renewed elastomer compositions which are derived from reclaimed rubber which retain uncured and cured chemical and mechanical characteristics which are virtually the same as virgin rubber. In other words, it would be highly desirable for such an elastomer to be capable of being processed in essentially the same way as virgin rubber and to be capable of being substituted in total or at least in part for virgin rubber in manufacturing useful products. Such a renewed rubber would optimally exhibit physical and dynamic properties which are virtually identical to the properties of the virgin rubber. It would also optimally have cure characteristics and process viscosity which are similar to those of the virgin rubber. The renewed rubber can be utilized in more demanding applications as an elastomeric component rather than a filler, as its properties more closely assimilate the properties of virgin rubber. Accordingly, the renewed rubber will have greater value from a technical and economic standpoint as it more closely mimics the cure characteristics and physical properties of virgin rubber.

SUMMARY OF THE INVENTION

The present invention provides a method for chemically functionalizing micronized rubber powder which is reclaimed from rubber products to provide the renewed rubber composition with properties which mimic virgin rubber and which can be used as the rubber for manufacturing new rubber articles. In other words, this renewed rubber can be used as the rubber constituent or a part of the rubber formulation employed in manufacturing rubber products, such as tires, hoses, power transmission belts, conveyor belts, and numerous other rubber articles. The renewed rubber of this invention performs the role of an uncured elastomer rather than merely serving the function of a filler.

The renewed rubber of this invention can be processed much more easily than conventional recycled rubber compositions. It also consistently exhibits an array of better overall cured rubber properties with only minimal variations in characteristics by using feedstocks made by various grinding methods. In the functionalization of the renewed rubber compositions of this invention the sulfur-sulfur bonds in micronized rubber powder are broken to devulcanize the rubber with only a minimal number of carbon-carbon double bonds in the backbone of the polymer being broken. This allows for the renewed rubber of this invention to be used at least in part, or combined with other materials such as virgin polymers, reclaim rubber, or rubber chemicals to name a few, as the rubbery component of rubber formulations (rubber compounds) that are used in manufacturing a wide array of rubber products, including tires, power transmission belts, conveyor belts, hoses, and a wide array of other products.

The present invention more specifically discloses a method for manufacturing an environmentally friendly, chemically functionalized, renewed rubber composition having a highly desirable combination of physical properties and which exhibits excellent processability comprising the steps of (1) blending a micronized rubber powder with a processing aid and functionalizing agent(s) to produce a blended mixture; (2) processing the blended mixture under conditions of high shear and low temperature to produce a reacted mixture; (3) adding a stabilizer to the reacted mixture to produce the renewed rubber.

The subject invention further reveals a chemically functionalized renewed rubber composition which is comprised of an elastomeric polymer and a stabilizer; wherein the rubber composition has a crosslink density which is within the range of 0.05 to $2.0 \times 10^{-5}$ mole/g, preferably in the range of 0.1 to $1.8 \times 10^{-5}$ mole/g, and wherein the rubber composition has a solubility fraction of less than 90 percent, preferably less than 50 percent, and most preferably less than 30 percent.

The present invention also discloses a rubber composition which is typically in the form of a slab which is comprised of a micronized rubber powder having a maximum particle size of 400 µm, preferably less than 200 µm, and most preferably a maximum particle size of less than 100 µm, wherein the micronized rubber powder is comprised of polymeric chains containing multiple double bonds in their backbones, wherein polymeric chains within the micronized rubber powder are crosslinked together with sulfur, and wherein polymeric chains within the micronized rubber powder are functionalized with moieties of the structural formula:

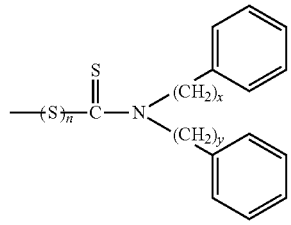

wherein n represents an integer from 1 to 10, wherein x represents an integer from 1 to 10, and wherein y represents an integer from 1 to 10. These compositions will also typically contain a soluble fraction of the rubber having soluble processing aid and polymeric chains containing multiple double bonds in their backbones which are functionalized with moieties having the structure illustrated above. Slabs of this functionalized rubber composition easily process in internal mixers and extruders and incorporate into a rubber matrix alone or with other polymeric materials and compounding ingredients and fillers.

The subject invention also reveals a functionalized renewed rubber composition which is typically in the form of a slab which is comprised of a micronized rubber powder having a maximum particle size of 400 µm, preferably less than 200 µm, and most preferably a maximum particle size of less than 100 µm, wherein the micronized rubber powder is comprised of polymeric chains containing multiple double bonds in their backbones, wherein polymeric chains within the micronized rubber powder are crosslinked together with sulfur, and wherein polymeric chains within the micronized rubber powder are functionalized with moieties of the structural formula:

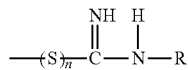

wherein n represents an integer from 1 to 10. These compositions will also typically contain a soluble fraction of the rubber having soluble processing aid and polymeric chains containing multiple double bonds in their backbones which are functionalized with moieties having the structure illustrated above. Slabs of this functionalized rubber composition easily process in internal mixers and extruders and incorporate into a rubber matrix alone or with other polymeric materials and compounding ingredients and fillers.

The functionalized renewed rubber composition of this invention can be processed from being in the form of a powder into the form of a slab. Accordingly, the present invention also discloses a functionalized renewed rubber composition which is in the form of a slab which is comprised of a micronized rubber powder having a maximum particle size of 400 µm, preferably less than 200 µm, and most preferably a maximum particle size of less than 100 µm, wherein the micronized rubber powder is comprised of polymeric chains containing multiple double bonds in their backbones, wherein polymeric chains within the micronized rubber powder are crosslinked together with sulfur, and wherein polymeric chains within the micronized rubber powder are functionalized with moieties of the structural formula:

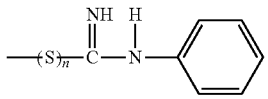

wherein n represents an integer from 1 to 10. These compositions will also typically contain a soluble fraction of the rubber having soluble processing aid and polymeric chains containing multiple double bonds in their backbones which are functionalized with moieties having the structure illustrated above. In some cases it is desirable for the functionalized renewed rubber compositions of this invention to be further processed into the form of slabs. This is because slabs of the functionalized rubber composition can be easily process in internal mixers and extruders and incorporate into a rubber matrix alone or with other polymeric materials, compounding ingredients and/or fillers.

DETAILED DESCRIPTION OF THE INVENTION

Figure 1:
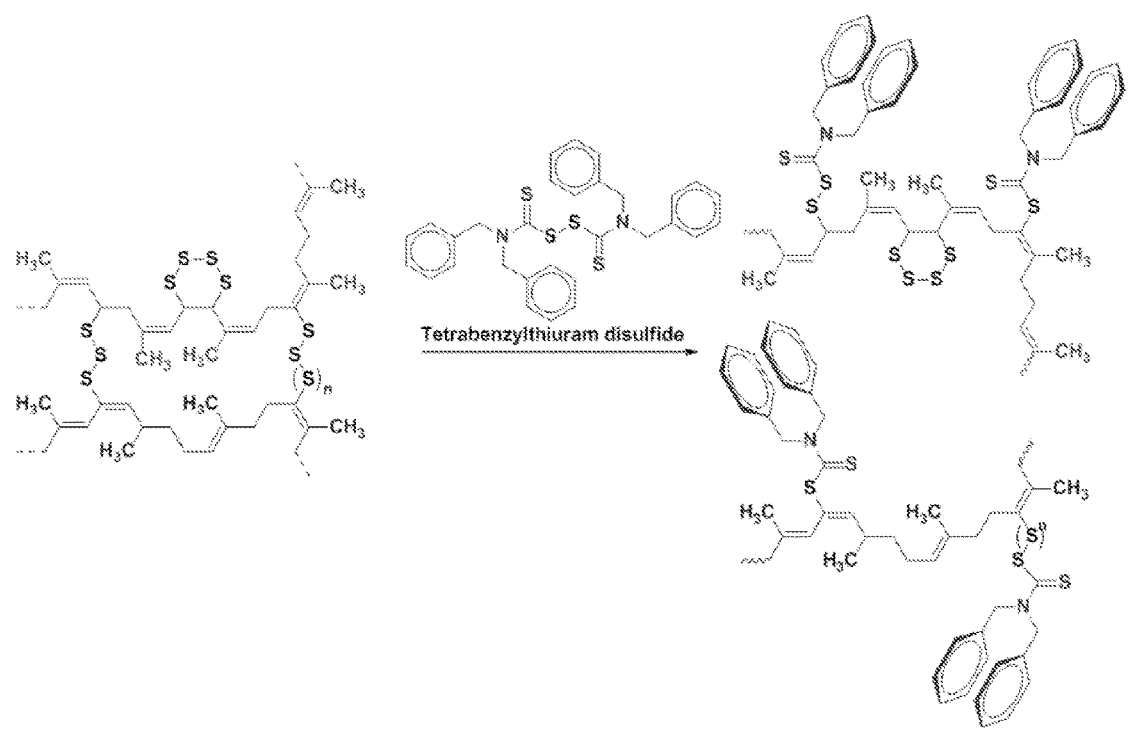
FIG. 1 illustrates the functionalization of a cured polyisoprene rubber in accordance with this invention which utilizes tetrabenzylthiuram disulfide as the functionalizing agent.

The micronized rubber powder used in the process of this invention can be made utilizing virtually any technique which results in the powder having a small particle size which is typically 10 mesh or less. The micronized rubber powder will more typically have a particle size of no more than 30 mesh. In some applications it may be advantages to employ a micronized rubber powder having a particle size of 80 mesh, 140 mesh, or even smaller.

In one specific embodiment of this invention the micronized rubber powder can be made utilizing the cryogenic grinding system described in U.S. Pat. No. 7,445,170 and an impact mill as described in U.S. Pat. No. 7,861,958. The teachings of U.S. Pat. No. 7,445,170 and U.S. Pat. No. 7,861,958 are incorporated herein for purposes of describing useful techniques and equipment which can be employed in making micronized rubber power that can be employed in making renewed chemically functionalized rubber compositions in accordance with this invention.

Micronized rubber powder can also be made in many other ways other than described above, such as but not limited to a wet grinding process, ambient temperature grinding process, and other cryogenic processes. Utilizing micronized rubber powder of the same material composition manufactured by any process in this invention will result in similar chemically functionalized materials which exhibit excellent processability as well as cure properties.

The rubber utilized in making the micronized rubber powder can be virtually any kind of sulfur cured rubber compound and can come from a wide variety of sources. For instance, the rubber compound can be comprise of natural rubber, synthetic polyisoprene rubber, high cis-1,4-polybutadiene rubber, medium vinyl polybutadiene rubber, high vinyl polybutadiene rubber, emulsion styrene-butadiene rubber, solution styrene-butadiene rubber, styrene-isoprene-butadiene rubber, styrene-isoprene rubber, butyl rubber, chlorobutyl rubber, bromobutyl rubber, polynorbornene rubber, ethylene-propylene rubber (EPR), ethylene-propylene-diene rubber (EPDM), nitrile rubber, carboxylated nitrile rubber, polychloroprene rubber (neoprene rubber), polysulfide rubbers, polyacrylic rubbers, silicon rubbers, chlorosulfonated polyethylene rubbers, and the like as well as various mixtures thereof.

The rubber compound recovered from buffing vehicle tire treads, in recapping procedures is one example of a source of the rubber compound for use in making the micronized rubber powder. However, the rubber compound can come from a wide variety of sources including whole tire rubber, tire side walls, tire innerliners, tire carcasses, power transmission belts, conveyor belts, hoses, and a wide variety of other rubber products. In any case, the "rubber buffings" from tire treads are comprised of the rubber compound, which is buffed off of the vehicle tire tread in preparing the old tire carcass for being recapped. In the recapping procedure a new tread is applied to the old tire carcass and cured onto it to make the retreaded tire. In any case, such vehicle tire retread buffings are comprised predominantly of natural rubber, synthetic polyisoprene rubber, polybutadiene rubber, and styrene-butadiene rubber. These retread buffings are typically a mixture of natural rubber and various synthetic rubbers. Accordingly, the micronized rubber powder utilized in accordance with this invention is typically a powder of a blend of natural rubber, synthetic polyisoprene rubber, polybutadiene rubber, and styrene-butadiene rubber. However, the micronized rubber powder can be a blend of any two or more of such rubbers or it can be comprised of only one type of rubber. For instance, the micronized rubber powder can consist solely of natural rubber, synthetic polyisoprene rubber, styrene-butadiene rubber, a blend of natural rubber and polybutadiene rubber, or a blend of natural rubber and styrene-butadiene rubber.

More specifically optimum properties in tire applications, especially wear, can be obtained when the infeed material (raw starting material) used to make the micronized rubber powder matches the final rubber compound composition. For example, using a truck tread buffing based predominantly on natural rubber as the starting material to make micronized rubber powder. Then using this specific micronized rubber powder back into truck tire applications will exhibit excellent compound properties. In passenger car tire applications, using predominantly styrene-butadiene rubber compounds as the starting material to micronized rubber powder and then using this specific micronized rubber powder back into passenger styrene butadiene-rubber tread applications will exhibit excellent compound properties.

In the first step of the process of this invention the micronized rubber powder is blended with a processing aid and a functionalizing agent to produce a blended mixture. The processing aid will typically be added at a level which is within the range of about 1 phr (parts by weight per 100 parts by weight of MRP) to about 20 phr. The processing aid will more typically be added at a level which is within the range of about 4 phr to about 15 phr and will preferably be included at a level which is within the range of 6 phr to 12 phr. The purpose of adding the processing aid is to penetrate the rubber compound and cause it to swell (wetting the surface is not sufficient). Accordingly, the processing aid is typically a low viscosity processing oil, such as a naphthenic oil, a pine oil, an orange oil, or a vegetable oil, which will swell the rubber rather than simply acting as a lubricant.

The functionalizing agent is typically added at a level which is within the range of 0.25 phr to about 8 phr and is more typically added at a level which is within the range of 0.5 phr to 6 phr. The functionalizing agent is preferably added at a level which is within the range of about 1 phr to about 4 phr. The functionalizing agent is typically a compound which acts to devulcanize the micronized rubber powder. Some representative examples of functionalizing agents that can be used include thiuram monosulfide, thiuram disulfide, thiuram multisulfide, tetrabenzylthiuram disulfide, cyclohexyl sulfonamide, t-butyl sulfonamide, tetraalkylthiuram disulfide, tetramethylthiuram disulfide, tetraethylthiuram disulfide, dipentamethylthiuram monosulfide, and tetramethylthiuram disulfide.

Further protocols for optimization of the process of this invention to fulfill the requirements of specific applications will be apparent to persons having ordinary skill in the art. For example, in some cases to decrease material costs it will be possible to utilize a lower level of processing aid while still achieving the desired objectives of the material. Furthermore, to increase productivity, some powders can be introduced into a processing aid and added to the process as a solution or slurry which would result in faster processing times. Optimization is also needed in compound development. For example, micronized rubber powder is currently used in typical rubber compounds over batch weight. The functionalized renewed rubber can also be used to replace raw material, such as polymer or filler.

The functionalizing agent can be a compound that includes xanthate group, such as di-alkyl xantate, sodium ethyl xanthate, potassium ethyl xanthate, sodium isopropyl xanthate, sodium isobutyl xanthate, potassium amyl xanthate, and the like. Such xanthate group containing compounds are typically of the structural formula:

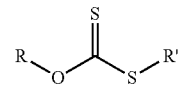

wherein R and R' represents hydrocarbyl groups which contain from 1 to 12 carbon atoms.

Thioxanthates can also be utilized as the functionalizing agent. They can be synthesized by reacting carbon disulfide ($CS_2$) with thiolate salts. For example, sodium ethylthioxanthate ($C_2H_5SCS_2Na$) can be used as the functionalizing agent in one embodiment of this invention. Dithiocarbamates are also useful as functionalizing agents in the practice of this invention. Dithiocarbamates are made by reacting carbon disulfide with an amine. Sodium diethyldithiocarbamate ($(C_2H_5)_2NCS_2Na$) is a representative example of the preferred dithiocarbamate that can be utilized in the practice of this invention.

Some additional representative examples of functionalizing agents that can be utilized in the practice of this invention include tetramethyl-2-phenylguanidine, N,N,N',N'-trimethylguanidine, 1,1,1trimethylguanidine, p-(1,3-dimethyl-3-phenylguanidino)benzoic acid, (diaminomethyleneamino) acetic acid, and 1,1,3-triethylguanidinium chloride.

After the processing aid and the functionalizing agent are added to the micronized rubber powder it is typically advantageous to age the blended mixture for at least 2 hours before further processing. The blended mixture will more typically be aged for at least 4 hour and in many cases for at least 6 hours before further processing. The blended mixture will preferably be aged for at least 8 hours and in many cases for 12 hours to 24 hours before further processing. It is also typically advantageous to mix N,N'-diphenyl guanidine into the blended mixture.

The blended mixture is then processed under conditions of high shear and low temperature to produce a reacted mixture. During this step the reacted mixture will typically be maintained at a temperature of 70° C. or less and preferably 50° C. or less. In some cases it is advantageous to maintain the reacted mixture at a temperature of 30° C. or even as low as 0° C. For instance, a temperature which is within the range of −20° C. to 30° C. would be highly suitable. In one embodiment of the subject invention this is done by passing the blended mixture through a mill having counter-rotating rolls which rotate at different speeds. According to some embodiments of this invention the rolls are maintained at a temperature of 70° C. or less, preferably 50° C. or less and most preferably 30° C. or less while the reclaimed elastomer is subjected to shear. According to some embodiments of this invention, the rolls are spaced apart at a distance of 0.4 mm or less, typically 0.2 mm or less, and preferably 0.1 mm or less. According to some embodiments of this invention the rubber blend is passed through the rolls of the mill multiple times.

A stabilizer is then added to the reacted mixture to produce the chemically functionalized renewed rubber composition. The stabilizer can be mixed into the reacted mixture using a mill mixer or an internal mixer, such as a Banbury mixer. The stabilizer will typically be added at a level which is within the range of about 0.25 phr to about 5 phr and will more typically be added at a level which is within the range of about 0.5 phr to about 3 phr. The stabilizer will preferably be added at a level which is within the range of about 1 phr to about 2 phr. The stabilizer is typically a vulcanization retarder, such as N-cyclohexyl (thio)phthalimide (CAS No. 17796-82-6).

The functionalized renewed rubber composition made by the process of this invention typically has a Mooney ML1+4 viscosity which is within the range of about 50 to 140 and which is preferably within the range of 70 to 120. This functionalized renewed rubber composition is comprised of an elastomeric polymer and a stabilizer; wherein the rubber composition has a crosslink density which is within the range of 0.05 to $2.0 \times 10^{-5}$ mole/g, preferably within the range of 0.1 to $1.8 \times 10^{-5}$ mole/g, and wherein the rubber composition has a solubility fraction of less than 90 percent. The functionalized renewed rubber compositions of this invention are typically chemically functionalized in a manner whereby the functional group is bound to the rubber by covalent bonds, ionic bonds, hydrogen bonds, and/or van der Waals forces. The elastomeric polymer is typically a polydiene rubber, such as natural rubber, polybutadiene rubber, synthetic polyisoprene rubber, styrene-butadiene rubber, or a blend of any or all of these rubbers. The chemically functionalized renewed rubber compositions of this invention typically have a solubility fraction of less than 50 percent and more typically of less than of less than 30. These compositions also typically contain aniline.

In one embodiment of this invention the functionalized renewed rubber composition is comprised of a micronized rubber powder having a maximum particle size of 75 μm, wherein the micronized rubber powder is comprised of polymeric chains containing multiple double bonds in their backbones, wherein polymeric chains within the micronized rubber powder are crosslinked together with sulfur, and wherein polymeric chains within the micronized rubber powder are functionalized with moieties of the structural formula:

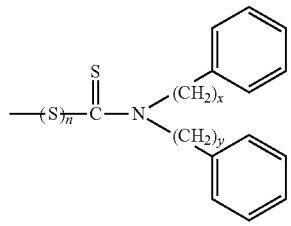

wherein n represents an integer from 1 to 10, wherein x represents an integer from 1 to 10, and wherein y represents an integer from 1 to 10. In many cases n, x, and y will represent an integer from 1 to 6 and will often represent in integer from 1 to 4. In one embodiment of this invention x and y will represent the integer 1. In such cases the polymeric chains within the micronized rubber powder will be functionalized with moieties of the structural formula:

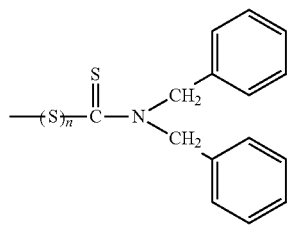

wherein n represents an integer from 1 to 10 and typically represents an integer from 1 to 4. In one embodiment of this invention the micronized rubber powder is further functionalized with moieties of the structural formula:

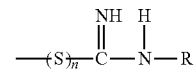

wherein n represents an integer from 1 to 10 and represents an integer from 1 to 6. It is frequently preferred for n represents an integer from 1 to 4, such as the integer 1. n represents 1. Such functionalized renewed rubbers are typically further comprised of a stabilizer, such as N-cyclohexyl (thio)phthalimide.

In another embodiment of this invention the functionalized renewed rubber is comprised of a micronized rubber powder having a maximum particle size of 75 μm, wherein the micronized rubber powder is comprised of polymeric chains containing multiple double bonds in their backbones, wherein polymeric chains within the micronized rubber powder are crosslinked together with sulfur, and wherein polymeric chains within the micronized rubber powder are functionalized with moieties of the structural formula:

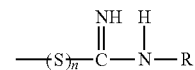

wherein n represents an integer from 1 to 10.

In a further embodiment of this invention the functionalized renewed rubber is comprised of a micronized rubber powder having a maximum particle size of 75 μm, wherein the micronized rubber powder is comprised of polymeric chains containing multiple double bonds in their backbones, wherein polymeric chains within the micronized rubber powder are crosslinked together with sulfur, and wherein polymeric chains within the micronized rubber powder are functionalized with moieties of the structural formula:

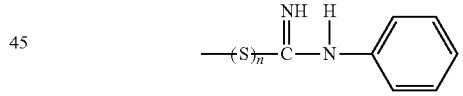

wherein n represents an integer from 1 to 10 and more typically represents an integer from 1 to 6. It is generally preferred for n to represents an integer from 1 to 4, such as the integer 1.

The functionalized renewed rubber formulations of this invention can be in a wide variety of physical forms. For instance, in the milling procedures typically used, the renewed rubber formulation will generally be in the form of a slab or a sheet. Such slabs or sheets are convenient for utilization by manufacturer of rubber products by virtue of the fact that such sheets can be conveniently blended with other rubbers and compounding ingredients such as antidegredants, accelerators, curatives, and the like. However, the renewed rubber composition of this invention can also be processed into other geometric forms which are useful for incorporation into rubber and plastic products or articles. For instance, in rubber applications it is typically convenient to reuse the rubber formulation in the form of slabs, sheets, cubes, or hexahedrons. In the plastics industry, it is typically preferred for the renewed rubber formulation to be presented in the form of pellets, or a powder. In any case, the functionalized renewed rubber formulations of this invention can be processed into a geometric form of any desired size or shape. For instance, slabs of the renewed rubber formulation can be chopped into cubes, pelletized, or ground into a powder. In any case, the renewed rubber formulation will contain the functionalized micronized rubber powder which is formed into the desired size and shape.

Examples 1-4

In this series of experiments, a micronized rubber powder was functionalized in accordance with this invention to make a chemically functionalized renewed rubber composition. In the procedure used, 200 grams of micronized rubber powder which had a particle size of 30 mesh was treated in a first stage with the chemicals outlined in Tables 1 and 2. This composition was allowed to sit overnight. The mixture was then passed through a 2-roll mill at a gap of 100 microns. The cooling system of the 2-roll mill was set at 35° C. The composition was passed through the mill for several passes until the mixture became homogeneous. Once the composition became homogeneous, CTP was then added in the amounts outlined in Tables 1 and 2.

TABLE 1

Amounts of functional agent, process aids, and stabilizer added to Examples 1-3.

| Example # | MRP Size (Mesh) | MRP (g) | TBzTD (phr) | DPG (phr) | Oil (phr) | CTP (phr) |
|---|---|---|---|---|---|---|
| 1 | Aged Tire tread | | 0 | 0 | 0 | 0 |
| 2 | 30 | 200 | 2 | 0 | 9.1 | 1.5 |
| 3 | 30 | 200 | 1 | 3 | 9.1 | 1 |

TBzTDT = Tetrabenzylthiuram disulfide
DPG = N,N'-diphenyl guanidine
CTP = N-cyclohexyl(thio)phthalimide
Oil = Cross C-100

TABLE 2

Composition of chemicals added to Example 4.

| Example # | MRP Size (Mesh) | MRP (g) | Benzoic Acid | Zinc oxide | Stearic Acid | Hydro-quinone | Rosin |
|---|---|---|---|---|---|---|---|
| 4 - Industry Reference | 30 | 200 | 89.0% | 2.0% | 2.0% | 4.0% | 3.0% |

Rheology measurements, cure characteristics, and hardness were then taken for each of the samples. MDR 2000 rheometer and Mooney Viscosity results are shown in Table 3. Sample 1 was a fully-cured baseline material; therefore, rheometer results were not taken. From the results below, one skilled in the art will observe that samples 2 and 3 have viscosities that are acceptable compared to sample 4.

TABLE 3

Cure rheology & hardness (A) results for Examples 2-4.

| Example # | ML | MH | Ts1 | Tc90 | ML (1 + 4) | Hardness |
|---|---|---|---|---|---|---|
| 2 | 2.63 | 4.81 | 5.22 | 13.22 | 112 | 46.5 |
| 3 | 2.17 | 4.07 | 3.03 | 8.20 | 76.9 | 44.9 |
| 4 | 5.64 | 6.90 | 7.03 | 11.22 | Off Scale (>200) | 59.0 |

A cross link density analysis was also performed on these samples. Table 4 shows the overall as well as the poly-, di-, and mono-sulfidic crosslink densities for each material. It also reports the combined soluble fraction of each sample extract performed in both acetone and THF.

TABLE 4

Crosslink density analysis and soluble fraction for Examples 1-4.

| | Crosslink Density ($\times 10^{-5}$ mole/g) | | | | Soluble |
|---|---|---|---|---|---|
| Example # | Overall | Polysulphidic | Disulphidic | Monosulphidic | Fraction (%) |
| 1 | 3.87 (100%) | 2.12 (55%) | 1.12 (29%) | 0.63 (16%) | 0 |
| 2 | 1.76 (100%) | 0.99 (56%) | 0.15 (9%) | 0.62 (35%) | 8.5 |
| 3 | 1.37 (100%) | 0.76 (55%) | 0.61 (45%) | | 9.9 |
| 4 | 2.19 (100%) | 1.25 (57%) | 0.44 (20%) | 0.50 (23%) | 5.8 |

In Example 4, an industry reference chemistry was investigated. In the procedure used, 200 grams of micronized rubber powder which had a particle size of 30 mesh was added to a mixture of chemicals just prior to milling. The composition of the chemicals added to the MRP is outlined in Table 2. The mixture was then passed through a 2-roll mill at a gap of 100 microns. The cooling system of the 2-roll mill was set at 55° C. The composition was passed through the mill for several passes until the mixture became homogeneous.

Figure 2:
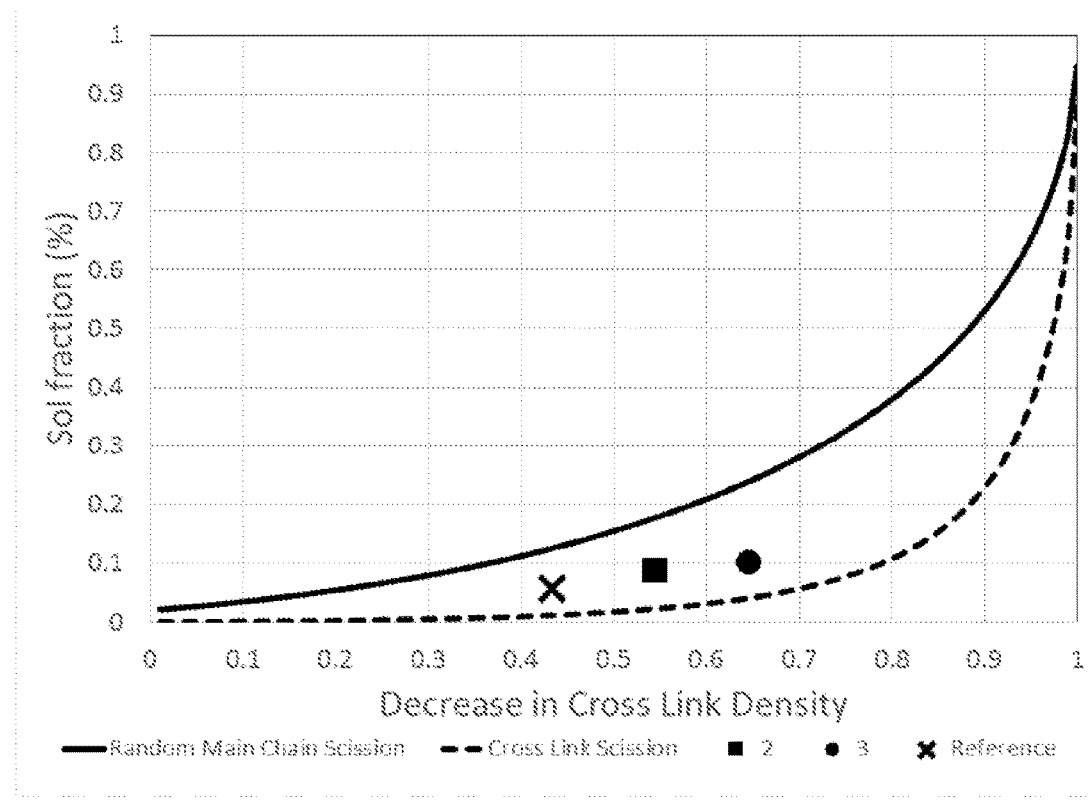
FIG. 2 illustrates the Horikx plot for Examples 2-4.

By plotting the decrease in crosslink density versus the soluble fraction, one can investigate if carbon-carbon bonds, sulfur-carbon, or sulfur-sulfur bonds are broken during functionalization. The crosslink scission line on the Horikx plot is indicative of more S—C and S—S bonds that are broken while not disturbing the C—C bonds in the polymer backbone. The main chain scission line on the Horikx plot is more indicative of C—C bonds being broken on the polymer backbone. See FIG. 2 for the Horikx plot on Samples 2-4.

These samples were then mixed into a control compound comprised of 70%/30% blend of emulsion styrene-butadiene rubber and polybutadiene rubber which included carbon black as a filler using an internal mixer at a loading level of 20 weight percent. The processability and cure compound characteristics of these rubber blends were then determined after being cured with a standard sulfur cure package. The cure rheology and compound properties of these rubber blends are shown in Table 5. From the data below it can be seen that the renewed rubber composition has better processing and properties than MRP only.

TABLE 5

Compound characteristics for 20% loading into control compound for Example 2 compared to MRP only and control compound.

| Example # | ML | MH | Ts1 | Tc90 | Tensile | Elongation @ Break | 300% Modulus |
|---|---|---|---|---|---|---|---|
| Control | 1.56 | 15.18 | 4.41 | 12.63 | 18.7 | 677 | 9.0 |
| MRP only (30 mesh) | 2.34 | 10.84 | 3.45 | 10.76 | 13.0 | 591 | 6.8 |
| 2 | 1.71 | 14.11 | 2.09 | 5.48 | 16.6 | 551 | 9.5 |

Examples 5-23

In this series of experiments, a micronized rubber powder was functionalized in accordance with this invention to make a chemically functionalized renewed rubber composition. In the procedure used, 200 grams of micronized rubber powder which had a particle size of 80 mesh (except example 22 which was 40 mesh) was treated in a first stage with the chemicals outlined in Table 6. This composition was allowed to sit overnight. The mixture was then passed through a 2-roll mill at a gap of 100 microns. The cooling system of the 2-roll mill was set at 35° C. The composition was passed through the mill for several passes until the mixture became homogeneous. Once the composition became homogeneous, CTP was then added in the amounts outlined in Table 6.

TABLE 6

Chemical compositions of Examples 5-23.

| Example # | MRP Size (Mesh) | MRP (g) | TBzTD (phr) | DPG (phr) | Oil (type C-100) (phr) | CTP (phr) |
|---|---|---|---|---|---|---|
| 5 | 80 | 200 | 4 | 0 | 9.1 | 0 |
| 6 | 80 | 200 | 4 | 0 | 9.1 | 2 |
| 7 | 80 | 200 | 4 | 0 | 9.1 | 3 |
| 8 | 80 | 200 | 4 | 0 | 9.1 | 4 |
| 9 | 80 | 200 | 2 | 0 | 9.1 | 0 |
| 10 | 80 | 200 | 2 | 0 | 9.1 | 1 |
| 11 | 80 | 200 | 2 | 0 | 9.1 | 1.5 |
| 12 | 80 | 200 | 2 | 0 | 9.1 | 2 |
| 13 | 80 | 200 | 2 | 0 | 9.1 | 3 |
| 14 | 80 | 200 | 2 | 2 | 9.1 | |
| 15 | 80 | 200 | 0 | 3 | 9.1 | 0 |
| 16 | 80 | 200 | 2 | 0 | 4.5 | 1.5 |
| 17 | 80 | 200 | 2 | 0 | 2 | 1.5 |
| 18 | 80 | 200 | 2 | 0 | 0 | 1.5 |
| 19 | 80 | 200 | 1 | 0 | 9.1 | 1 |
| 20 | 80 | 200 | 1 | 1 | 9.1 | 1 |
| 21 | 80 | 200 | 1 | 3 | 9.1 | 1 |
| 22 | 40 | 200 | 2 | 0 | 9.1 | 0 |
| 23 | 80 | 200 | 1 | 1 | 9.1 | 0 |

An MDR 2000 was then used to investigate rheology and cure characteristics for each treated sample outlined above. Results for all examples are shown in Table 7.

TABLE 7

Rheology & cure data for Examples 5-23.

| Example # | ML | MH | Ts1 | Tc90 |
|---|---|---|---|---|
| 5 | 4.52 | 11.53 | 1.06 | 3.98 |
| 6 | 3.43 | 7.70 | 2.08 | 9.77 |
| 7 | 3.87 | 7.10 | 4.16 | 13.09 |
| 8 | 3.38 | 6.12 | 8.04 | 17.28 |
| 9 | 5.33 | 9.68 | 1.11 | 4.02 |
| 10 | 4.85 | 7.66 | 2.00 | 9.32 |
| 11 | 4.50 | 6.88 | 1.52 | 12.02 |
| 12 | 4.49 | 6.41 | 7.59 | 15.05 |
| 13 | 4.35 | 5.57 | 15.08 | 16.58 |
| 14 | 3.80 | 6.91 | 2.58 | 11.16 |
| 15 | 5.17 | 5.51 | >20 | >20 |
| 16 | 4.88 | 7.56 | 3.46 | 11.21 |
| 17 | 5.48 | 8.37 | 3.29 | 11.47 |
| 18 | 5.36 | 8.86 | 2.40 | 11.40 |
| 19 | 4.98 | 6.12 | 10.91 | 11.62 |
| 20 | 4.13 | 5.34 | 7.37 | 8.99 |
| 21 | 3.54 | 4.52 | >20 | >20 |
| 22 | 4.92 | 6.69 | 6.66 | 12.57 |
| 23 | 4.24 | 7.08 | 0.77 | 2.46 |

These samples were then mixed into a control compound comprised of 70%/30% blend of emulsion styrene-butadiene rubber and polybutadiene rubber which included carbon black as a filler using a two roll mill at both 10 weight percent and 20 weight percent loadings cure rheology is shown in Table 8. The processability and cure rheology characteristics of these blends were then determined after being cured with a standard sulfur cure package and are reported in Table 9.

Cure rheology for the control compound used in examples 5-15 is shown in Table 9.

TABLE 8

Cure rheology for control compound used in Examples 5-15

| Example # | ML | MH | Ts1 | Tc90 |
|---|---|---|---|---|
| Control Compound | 1.52 | 14.63 | 4.41 | 12.58 |

TABLE 9

Cure rheology characteristics at 10 & 20 wt % loadings in control compound for examples 5-15.

| | 10% Loading in Control | | | | 20% Loading in Control | | | |
|---|---|---|---|---|---|---|---|---|
| Example # | ML | MH | Ts1 | Tc90 | ML | MH | Ts1 | Tc90 |
| 5 | — | — | — | — | 1.91 | 17.87 | 1.63 | 4.47 |
| 6 | — | — | — | — | 1.9 | 17.0 | 2.6 | 7.2 |
| 7 | 1.8 | 16.4 | 3.6 | 8.1 | | | | |
| 8 | 1.6 | 16.3 | 3.9 | 8.9 | 1.8 | 16.1 | 3.6 | 9.1 |
| 10 | 1.8 | 15.1 | 3.4 | 7.8 | 2.0 | 15.0 | 2.9 | 6.8 |
| 11 | 1.8 | 15.4 | 3.8 | 8.4 | 1.7 | 15.1 | 4.3 | 9.3 |
| 12 | 1.8 | 14.8 | 3.8 | 8.7 | 2.1 | 14.5 | 3.4 | 7.9 |
| 13 | 1.7 | 14.9 | 4.6 | 10.1 | — | — | — | — |

Example 11 was investigated further at 10% loading in a 70/30 eSBR/PBR carbon black control compound. Tables 10 & 11 illustrates the cured physical properties obtained for both the control compound and the compound containing 10% material after being cured with a standard sulfur cure package.

TABLE 10

Physical properties of control compound and MRP only vs 10% loading of Example 11.

| Example # | ML | MH | Ts1 | ML (1 + 4) | Swelling & Porosity | Garvey Die Extrusion Edge | Surface | Corners | Total |
|---|---|---|---|---|---|---|---|---|---|
| Control | 1.54 | 15.16 | 4.57 | 46.4 | 4 | 4 | 4 | 4 | 16 |
| MRP only (80 mesh) | 2.01 | 14.46 | 3.95 | 55.2 | 4 | 1 | 3 | 4 | 12 |
| 11 | 1.77 | 14.82 | 3.23 | 48.3 | 4 | 2 | 4 | 4 | 14 |

TABLE 11

Continued physical properties of control compound and MRP only vs 10 wt % loading of Example 11.

| Example # | Hardness (A) RT | Hardness (A) 70° C. | Unaged Tensile MPa | E@B % | 300% Mod | Heat Build up ° C. | Comp. Set % | 0° C. Rebound | 70° C. Rebound | Abrasion Vol. loss |
|---|---|---|---|---|---|---|---|---|---|---|
| Control | 71 | 61 | 18.7 | 637.2 | 9.4 | 34.6 | 8.2 | 33.4 | 50.5 | 75 |
| MRP only (80 mesh) | 71 | 61 | 16.7 | 593.3 | 8.8 | 41.4 | 12.1 | 30.4 | 49.7 | 63 |
| 11 | 71 | 63 | 17.5 | 607.7 | 9.1 | 32.2 | 6.8 | 31.4 | 52.1 | 68 |

Examples 16-23 were mill mixed at 10 wt % loading into a 70/30 eSBR/PBR carbon black control compound. After being cured with a standard sulfur cure package Cure rheology and properties are shown in Table 12.

TABLE 12

Cure rheology characteristics and properties for 10 wt % loading of Examples 16-23.

| Example # | Mix | ML | MH | Ts1 | RT° C. Rebound | 70° C. Rebound | Tensile MPa | E@B % | 300% Mod |
|---|---|---|---|---|---|---|---|---|---|
| Control (average) | Smooth | 1.58 | 15.19 | 4.36 | 43 | 50.5 | 17.7 | 621 | 9.0 |
| 16 | Very Rough | 1.89 | 14.10 | 3.73 | — | — | — | — | — |
| 17 | Very Rough | 1.91 | 14.54 | 3.62 | 41.5 | 49.9 | 12.4 | 507 | 7.8 |
| 18 | Very Rough | 1.95 | 13.99 | 3.52 | — | — | — | — | — |
| 19 | Rough | 1.87 | 13.78 | 4.02 | — | — | — | — | — |
| 20 | Smooth | 1.79 | 14.40 | 3.42 | 42.0 | 49.4 | 16.4 | 651 | 8.0 |
| 21 | Smooth | 1.77 | 15.12 | 2.84 | 41.9 | 49.1 | 16.9 | 627 | 8.4 |
| 22 | Smooth | 1.89 | 14.10 | 3.73 | 42.2 | 49.9 | 15.8 | 543 | 9.0 |
| 23 | Rough | 1.85 | 14.44 | 3.30 | 42.0 | 48.7 | 15.9 | 610 | 8.2 |

Example 24

In this experiment a micronized rubber powder was functionalized in accordance with this invention to make a chemically functionalized renewed rubber composition. 200 grams of micronized rubber powder which had a particle size of 80 mesh was treated with 3 phr MBT and 9.1 phr oil and was allowed to sit overnight. The mixture was then passed through a 2-roll mill at a gap of 100 microns. The cooling system of the 2-roll mill was set at 35° C. The composition was passed through the mill for several passes until the mixture became homogeneous. Rheology and cure results are shown in Table 13.

TABLE 13

Rheology & cure data for Example 24.

| Example # | ML | MH | Ts1 | Tc90 |
|---|---|---|---|---|
| 24 | 6.59 | 9.48 | 1.85 | 5.95 |

Example 24 was also mill mixed at 10 wt % loading level into a carbon black control compound comprised of 70%/30% blend of emulsion styrene-butadiene rubber and polybutadiene rubber. After being cured with a standard sulfur cure package the cure rheology characteristics of this rubber formulation were determined and are reported in Table 14.

TABLE 14

Cure rheology characteristics for 10 wt % loading of Example 24 into control compound.

| Example # | ML | MH | Ts1 | Tc90 |
|---|---|---|---|---|
| Control Compound | 1.52 | 14.63 | 4.41 | 12.58 |
| 24 | 1.8 | 14.0 | 2.4 | 7.6 |

Examples 25-29

In this series of experiments, a micronized rubber powder was functionalized in accordance with this invention to make a chemically functionalized renewed rubber composition. In the procedure used, 200 grams of micronized rubber powder which had a particle size of 80 mesh was treated in a first stage with the chemical composition outlined in Table 15. This composition was allowed to sit overnight. The mixture was then passed through a 2-roll mill at a gap of 100 microns. The cooling system of the 2-roll mill was set at 35° C. The composition was passed through the mill for several passes until the mixture became homogeneous. Once the composition became homogeneous, a stabilizer was then added in the amounts outlined in Table 15.

TABLE 15

Chemical compositions of Examples 25-29.

| Example # | MRP Size (Mesh) | MRP (g) | TBzTD (phr) | DPG (phr) | Oil (type C-100) (phr) | Zinc oxide (phr) | Stearic Acid (phr) | CTP (phr) | Vulkalent E/C (phr) |
|---|---|---|---|---|---|---|---|---|---|
| 25 | 80 | 200 | 2 | 0 | 9.1 | 1 | 1 | 1.5 | 0 |
| 26 | 80 | 200 | 2 | 0 | 9.1 | 2 | 2 | 1.5 | 0 |
| 27 | 80 | 200 | 1 | 0 | 9.1 | 2 | 2 | 1 | 0 |
| 28 | 80 | 200 | 1 | 1 | 9.1 | 2 | 2 | 1 | 0 |
| 29 | 80 | 200 | 2 | 0 | 9.1 | 0 | 0 | 0 | 1.5 |

An MDR 2000 was then used to test cure rheology characteristics for each of these samples. Table 16 illustrates the results.

TABLE 16

Cure rheology characteristics for Examples 25-29.

| Example # | ML | MH | Ts1 | Tc90 |
|---|---|---|---|---|
| 25 | 4.2 | 6.7 | 3.9 | 11.7 |
| 26 | 4.6 | 6.9 | 4.5 | 11.5 |
| 27 | 5 | 6.3 | 7.9 | 11.7 |
| 28 | 3.6 | 5.2 | 4.9 | 9.4 |
| 29 | 4.7 | 10.8 | 1.2 | 8.0 |

By reviewing and comparing the information provided in Table 15 and 16 it is apparent that the utilization of stearic acid and zinc oxide did not provide a beneficial result. Accordingly, the method of this invention and the compositions made thereby can be prepared without utilizing stearic acid or zinc oxide with excellent results still being obtained. The renewed functionalized rubber compositions of this invention will therefore normally not contain zinc oxide or long chain fatty acids, such as stearic acid.

The renewed rubber composition of this invention can be blended with a wide variety of other elastomers and elastomeric compounds to make useful rubber formulations which can be used in numerous applications in rubber products. These products include all types of tires including luxury automobile tires, all season automobile tires, high performance automobile tires, race tires, winter tires, off the road tires, agricultural tires, mining tires, light truck tires, medium truck tires, heavy duty truck tires, earthmover tires, aircraft tires, bicycle tires, motorcycle tires, forklift truck tires, solid tires for home and industrial applications. The renewed rubber compositions of this invention can also be used in a retread formulation for retreading virtually any type of tire such as truck tires, aircraft tires, earthmover and automobile tires. The renewed rubber compositions of this invention can also be used in making power transmission belts, conveyer belts, hoses, o-rings, rings, gaskets, tracks for military, industrial, agricultural and recreational vehicles, including snow mobiles, windshield wiper blades, air springs, industrial vibration dampers. The renewed rubber compositions of this invention can also be used in the modification of plastics and as a processing aid for fillers including but not limited to clay, silica, carbon black, graphene, graphite and nano-structures (including carbon nano-tubes), concrete and asphalt modification for high performance asphalt applications. They can also be used in manufacturing a wide array of building materials such as roofing, insulation, water proofing, and pond liners.

In using the renewed rubber formulations of this invention in making useful rubber products, it is typically blended with one or more other elastomeric materials at a level ranging from 1 phr to 99 phr. It will typically be incorporated into such products at a range of 3 phr to 50 phr and will more typically be incorporated at a range of 5 phr to 40 phr. For instance, the renewed rubber formulation of this invention can be incorporated into a rubbery polymer at a level which is within the range of 10 phr to 30 phr.

The renewed rubber formulation of this invention can be included in blends with natural rubber, synthetic polyisoprene rubber, emulsion styrene butadiene rubber, solution styrene butadiene rubber, high cis 1,4-polybutadiene rubber having a cis isomer content of greater than 96 percent, medium vinyl polybutadiene rubber, low vinyl polybutadiene rubber, high vinyl polybutadiene rubber, high trans polybutadiene rubber, high trans styrene butadiene rubber and butadiene-α methylstyrene rubber, styrene isoprene rubber, styrene isoprene butadiene rubber, nitrile rubber, butyl rubber, carboxylated nitrile rubber, halobutyl rubber, ethylene propylene-diene monomer rubber (EPDM), ethylene-propylene rubber (EPR), hydrogenated nitrile rubber, and various blends thereof. These blends can contain 1 to 100 phr of the renewed rubber formulation of this invention. These blends can further be comprised of conventional rubber reclaim and also ground tire rubber. The level of conventional rubber reclaims and ground tire rubber will typically be in the range of 1.0 phr to 25 phr.

In tire tread formulations the renewed rubber formulation of this invention will typically be blended with virgin natural rubber, emulsion styrene butadiene rubber, solution styrene butadiene rubber and/or polybutadiene rubber at a level which is within the range of 5 to 50 phr. For instance, truck tread rubber used in steer tires and drive tires may be a blend of 5 phr to 50 phr of the renewed rubber formulation of this invention with 5 to 80 phr of virgin natural rubber and 5 phr to 80 phr of emulsion styrene butadiene rubber. The truck tread rubber used in truck trailer tires can be comprised of a simple blend of 5 phr to 50 phr of the renewed rubber formulation of this invention and 50 phr to 95 phr of virgin natural rubber.

Rubber formulations containing the renewed rubber of this invention can be compounded with reinforcing silica to improve processability and to improve the rolling resistance of tires made therewith. However, the renewed rubber of this invention can be reinforced with conventional carbon black fillers, starch, clay, lignin, modified lignin, graphene, modified graphene, carbon nanotubes, silica beads, talc, cross-linked gel and the like.

The renewed rubber formulation of this invention can be used in virtually any component of a tire, including the tread, the sidewall, the belt, the cap ply, the apex, the bead, the chafer, the innerliner, the skim coat, the under-tread, the base, the shoulder wedge, the belt wedge, the tread cushion, the tread wings, the shoulder skirt, the ply cushion, the tie gum, the rim strip, and the like. In tread rubber formulations for automobile and light truck applications, the renewed rubber will typically be blended with high cis PBD, solution SBR, and/or emulsion SBR. Such tread rubber compounds will typically contain from 5 to 50 phr of the renewed rubber, 40 to 80 phr of emulsion or solution SBR, and 5 to 50 phr of high cis polybutadiene rubber. In tire sidewall formulations the renewed rubber will typically be blended with natural rubber and polybutadiene rubber. In tire innerliner formulations the renewed rubber will typically be blended with natural rubber, a butyl rubber or a halobutyl rubber.

A tire tread compound made with the renewed rubber formulation of this invention can include, as a specific example, 40 phr of emulsion styrene butadiene rubber having a bound styrene content of 19%, a mooney viscosity of 50-65 and a glass transition temperature of −55° C., 67.50 phr of carbon black masterbatch, 30 phr of high cis-polybutadiene rubber, 22.73 phr of the renewed rubber formulation of this invention, 5 phr of process oil, 1 phr of 40 MS plasticizer, 3 phr of phenolic tackifier resin, 42.50 phr of N339 carbon black, 2.24 phr of N-(1,3-dimethylbutyl)-N'-phenyl-p-phenylenediamine antidegradant, 1.12 phr of 2,2,4-trimethyl-1,2-dihydroquinoline, 2.24 phr of microcrystalline wax/paraffin wax blend, 3.53 phr of zinc oxide dispersion (85% ZnO), 2 phr of stearic acid, 1 phr of N-tert-butyl-2-benzothioazolesulfenamide pellets, 0.10 phr of diphenyl guanidine pellets, 2.75 phr of sulfur dispersion (80% sulfur), and 0.10 phr of N-cyclohexylthio phthalimide retarder.

A specific example of a base or undertread tire formulation made with the renewed rubber formulation of this invention can include, as a specific example, 70 phr of natural rubber, 30 phr of high cis-polybutadiene rubber, 17.46 phr of the renewed rubber formulation of this invention, 2 phr of process oil (PAH<3%), 45 phr of N660 carbon black, 2 phr of 2,2,4-trimethyl-1,2-dihydroquinoline antidegradant, 3 phr of zinc oxide, 1.50 phr of stearic acid, 1.50 phr of N-tert-butyl-2-benzothioazolesulfenamide accelerator pellets, 2 phr of sulfur, and 0.20 phr of N-(cyclohexylthio) phthalimide retarder.

A specific example of a steel belt coat formulation made with the renewed rubber formulation of this invention can include, as a specific example, 60 phr of natural rubber, 40 phr of high cis-polybutadiene rubber, 23.24 phr of the renewed rubber formulation of this invention, 8 phr of process oil, 2 phr of alkyl phenol formaldehyde novalak tackifier resin, 75 phr of N326 carbon black, 2 phr of 2,2,4-trimethyl-1,2-dihydroquinoline antidegradant, 3 phr of hexamethyloxymethyl-melamine resin, 8 phr of reinforcing resin, 3 phr of zinc oxide, 1.50 phr of stearic acid, 1.50 phr of N-tert-butyl-2-benzothioazolesulfenamide accelerator pellets, 5 phr sulfur, and 0.20 phr of N-(cyclohexylthio) phthalimide retarder.

A specific example of a shoulder wedge or pad formulation made with the renewed rubber formulation of this invention can include, as a specific example, 100 phr of natural rubber, 19.13 phr of the renewed rubber formulation of this invention, 5 phr of process oil, 55 phr of N660 carbon black, 1 phr of 2,2,4-trimethyl-1,2-dihydroquinoline antidegradant, 5 phr of zinc oxide, 2.50 phr of stearic acid, 0.75 phr of N-cyclohexyl-2-benzothiazole sulfenamide (CBS) accelerator, and 3 phr of sulfur.

A specific example of a belt wedge formulation made with the renewed rubber formulation of this invention can include, as a specific example, 100 phr of natural rubber, 21.06 phr of the renewed rubber formulation of this invention, 2 phr of process oil (PAH<3%), 62 phr of N326 carbon black, 2 phr of 2,2,4-trimethyl-1,2-dihydroquinoline antidegradant, 6.70 phr of hexamethyloxymethyl-melamine resin, 2.50 phr of B-20-M reinforcing resin, 7 phr of zinc oxide, 1 phr of stearic acid, 0.75 phr of benzothiazyl-2-dicyclohexyl sulfonamide (DCBS) accelerator, and 5.60 phr of OT20 oil (PAH<3%).

A specific example of a tread cushion formulation made with the renewed rubber formulation of this invention can include, as a specific example, 100 phr of natural rubber, 21.19 phr of the renewed rubber formulation of this invention, 8 phr of process oil (PAH<3%), 4 phr of alkyl phenol formaldehyde novalak tackifier resin, 60 phr of N326 carbon black, 1 phr of 2,2,4-trimethyl-1,2-dihydroquinoline antidegradant, 2.50 phr of hexamethyloxymethyl-melamine resin, 1.25 phr of B-20-M reinforcing resin, 7 phr of zinc oxide, 1 phr of stearic acid, 0.50 phr of benzothiazyl-2-dicyclohexyl sulfonamide accelerator, and 5.50 phr of OT20 oil (PAH<3%).

A specific example of a tread wings formulation made with the renewed rubber formulation of this invention can include, as a specific example, 50 phr of natural rubber, 50 phr of high cis-polybutadiene rubber, 22.17 phr of the renewed rubber formulation of this invention, 16 phr of process oil, 2 phr of low molecular weight polyethylene wax, 5 phr of alkyl phenol formaldehyde novalak tack resin, 60 phr of N660 carbon black, 4.50 phr of N-(1,3-dimethylbutyl)-N'-phenyl-p-phenylenediamine (6PPD) antidegradant, 2 phr of 2,2,4-trimethyl-1,2-dihydroquinoline antidegradant, 2.50 phr of a microcrystalline and paraffin wax blend, 3 phr of zinc oxide, 2 phr of stearic acid, 0.50 phr of N-tert-butyl-2-benzothioazolesulfenamide accelerator pellets, and 2 phr of sulfur.

A specific example of a sidewall formulation made with the renewed rubber formulation of this invention can include, as a specific example, 50 phr of natural rubber, 50 phr of high cis-polybutadiene rubber, 20.43 phr of the renewed rubber formulation of this invention, 15 phr of process oil, 3 phr of alkyl phenol formaldehyde novalak tack resin, 50 phr of N660 carbon black, 4 phr of N-(1,3-dimethylbutyl)-N'-phenyl-p-phenylenediamine (6PPD) antidegradant, 2 phr of 2,2,4-trimethyl-1,2-dihydroquinoline antidegradant, 2.50 phr of microcrystalline and paraffin wax blend, 3 phr of zinc oxide, 2 phr of stearic acid, 0.50 phr of N-tert-butyl-2-benzothioazolesulfenamide accelerator pellets, and 2 phr of sulfur.

A specific example of a ply cushion formulation made with the renewed rubber formulation of this invention can include, as a specific example, 60 phr of natural rubber, 40 phr of emulsion styrene-butadiene rubber, 19.60 phr of the renewed rubber formulation of this invention, 10 phr of process oil, 3 phr of alkyl phenol formaldehyde novalak tack resin, 55 phr of N660 carbon black, 1 phr of 2,2,4-trimethyl-1,2-dihydroquinoline antidegradant, 3 phr of zinc oxide, 1 phr of stearic acid, 0.80 phr of 2,2'-dibenzothiazyl disulfide, 0.10 phr of diphenyl guanadine accelerator, and 2.50 phr of sulfur.

A specific example of a rim strip formulation made with the renewed rubber formulation of this invention can include, as a specific example, 40 phr of natural rubber, 15 phr of emulsion styrene-butadiene rubber, 45 phr of high cis polybutadiene rubber, 22.21 phr of the renewed rubber formulation of this invention, 15 phr of process oil, 2 phr of dark hydrocarbon resins, 3 phr of alkyl phenol formaldehyde novalak tackifier resin, 85 phr of N351 carbon black, 3 phr of N-(1,3-dimethylbutyl)-N'-phenyl-p-phenylenediamine (6PPD) antidegradant, 1 phr of 2,2,4-trimethyl-1,2-dihydroquinoline antidegradant, 2 phr of microcrystalline and paraffin wax blend, 3 phr of zinc oxide, 2 phr of stearic acid, 0.50 phr of N-tert-butyl-2-benzothioazolesulfenamide accelerator pellets, 1 phr of benzothiazyl-2-dicyclohexyl sulfenamide accelerator, 2.25 phr of sulfur and 0.25 phr of N-(cyclohexylthio) phthalimide retarder.

A specific example of a rubber chafer formulation made with the renewed rubber formulation of this invention can include, as a specific example, 50 phr of natural rubber, 25 phr of emulsion styrene-butadiene rubber, 25 phr of high cis polybutadiene rubber, 23.49 phr of the renewed rubber formulation of this invention, 10 phr of process oil, 2 phr of dark hydrocarbon resins, 2 phr of alkyl phenol formaldehyde novalak tackifier resin, 85 phr of N326 carbon black, 2 phr of 2,2,4-trimethyl-1,2-dihydroquinoline antidegradant, 1 phr of microcrystalline and paraffin wax blend, 3 phr of zinc oxide, 2 phr of stearic acid, 1.25 phr of N-tert-butyl-2-benzothioazolesulfenamide accelerator pellets, 3 phr of sulfur and 0.2 phr of N-(cyclohexylthio) phthalimide retarder.

A specific example of an apex formulation made with the renewed rubber formulation of this invention can include, as a specific example, 65 phr of natural rubber, 35 phr of high cis polybutadiene rubber, 24.99 phr of the renewed rubber formulation of this invention, 10 phr of process oil, 4 phr of alkyl phenol formaldehyde novalak tackifier resin, 80 phr of N326 carbon black, 2 phr of 2,2,4-trimethyl-1,2-dihydroquinoline antidegradant, 3.5 phr of hexamethyl oxymethylmelamine resin, 10 phr of reinforcing resin, 5 phr of zinc oxide, 2.50 phr of stearic acid, 1.50 phr of N-tert-butyl-2-benzothioazolesulfenamide accelerator pellets, 6.25 phr of OT20 oil, and 0.25 phr of N-(cyclohexylthio) phthalimide retarder.

A specific example of an innerliner formulation made with the renewed rubber formulation of this invention can include, as a specific example, 100 phr of chlorobutyl rubber, 24.13 phr of the renewed rubber formulation of this invention, 8 phr of process oil, 10 phr of dark hydrocarbon resins, 4 phr of alkyl phenol formaldehyde novalak tack resin, 60 phr of N660 carbon black, 30 phr of clay, 0.15 phr of magnesium oxide, 1 phr of zinc oxide, 2 phr of stearic acid, 1.50 phr of 2,2'-debenzothiazyl disulfide, and 3 phr of sulfur.

Example 30-31

In this series of experiments a conventional tire tread compound rubber (Example 30) was prepared utilizing 10% of an 80 mesh micronized natural rubber powder. In making this conventional tread rubber formulation, the micronized natural rubber was blended into 75 phr of solution styrene-butadiene rubber and 25 phr of high cis-1,4-polybutadiene rubber and cured with a conventional sulfur cure package. In this series of experiments another tire tread rubber formulation (Example 31) was made by substituting a chemically functionalized, renewed natural rubber composition at 10% loading level. Both of the cured rubber formulations made in this experiment were tested for abrasion loss utilizing a Zwick Rotary Drum Abrader (Din Abrasion) ASTM D 5963 Method A. The rubber formulation made utilizing the conventional micronized natural rubber showed an abrasion loss of 105 $mm^3$ (as compared to a conventional standard in accordance with procedure). However, the second rubber formulation made utilizing the a chemically functionalized, renewed natural rubber composition showed a much better abrasion loss of only 62 $mm^3$.

Example 32-33

In this series of experiments a conventional tire tread compound rubber (Example 32) was prepared utilizing 10% of emulsion styrene-butadiene rubber (ESBR). In this series of experiments another tire tread rubber formulation (Example 33) was made by substituting a chemically functionalized, renewed ESBR composition at 10% loading level. Both rubber formulations made in this experiment were tested for abrasion loss utilizing a Zwick Rotary Drum Abrader (Din Abrasion) ASTM D 5963 Method A. The rubber formulation made utilizing the 10% of solution ESBR showed an abrasion loss of 87 $mm^3$ (as compared to a conventional standard in accordance with procedure). However, the second rubber formulation made utilizing the a chemically functionalized, renewed ESBR composition showed a much better abrasion loss of only 69 $mm^3$.

While certain representative embodiments and details have been shown for the purpose of illustrating the subject invention, it will be apparent to those skilled in this art that various changes and modifications can be made therein without departing from the scope of the subject invention.

What is claimed is:

1. A method for manufacturing a renewed rubber composition comprising the steps of (1) blending a micronized rubber powder with a processing aid and a functionalizing agent to produce a blended mixture; (2) processing the blended mixture under conditions of high shear and low temperature to produce a reacted mixture; and (3) following formation of the reacted mixture; adding a stabilizer to the reacted mixture to produce the renewed rubber.

2. The method of claim 1 wherein the processing under conditions of high shear is generated in step (2) on a 2-roll mill.

3. The method of claim 1 wherein the functionalizing agent is a compound selected from the group consisting of alkyl thiuram sulfides, aryl thiuram sulfides, hetrocylic thiuram sulfides, thiuram disulfides, thiuram polysulfides, thiuram disulfides, thiuram multisulfides, tetrabenzylthiuram disulfides, cyclohexyl sulfonamides, t-butyl sulfonamides, tetraalkylthiuram disulfides, tetramethylthiuram disulfides, tetraethylthiuram disulfides; dipentamethylthiuram monosulfides, and tetramethylthiuram disulfides.

4. The method of claim 1 wherein a guanidine compound is blended into the micronized rubber powder in step (1).

5. The method of claim 4 wherein the guanidine compound is selected from the group consisting of alkyl guanidines, aryl guanidines, and hetrocyclic guanidines.

6. The method of claim 1 wherein N,N'-diphenyl guanidine is blended into the micronized rubber powder in step (1).

7. The method of claim 1 wherein the micronized rubber powder is a recycled tire rubber.

8. The method of claim 1 wherein the micronized rubber powder is comprised of a diene rubber.

9. The method of claim 1 wherein the stabilizer is a vulcanization retarder and wherein the renewed rubber has a solubility fraction of less than 30 percent.

10. The method of claim 1 wherein the stabilizer is N-cyclohexyl (thio) phthalimide.

11. The method of claim 1 wherein the renewed rubber composition is processed into the form of a sheet, a slab, a hexahedron, a pellet or powder.

12. The method of claim 1 wherein the micronized rubber powder is comprised of styrene-butadiene rubber.

13. The method of claim 1 wherein the micronized rubber powder is comprised of a blend of high cis-1,4-polybutadiene rubber and one or more additional rubbers wherein the high cis-1,4-polybutadiene rubber has a cis-microstructure content of at least 95 percent.

14. The method of claim 1 wherein the micronized rubber powder is crosslinked to a crosslink density which is within the range of $0.05 \times 10^{-5}$ moles/g to $2.0 \times 10^{-5}$ moles/g and has a soluble fraction of less than 90 percent.

15. The method of claim 14 wherein the micronized rubber powder is crosslinked to a crosslink density which is within the range of $0.1 \times 10^{-5}$ moles/g to $1.8 \times 10^{-5}$ moles/g and has a soluble fraction of less than 30 percent.

16. The method of claim 1 wherein said method is conducted at a temperature of less than 70° C.

17. The method of claim 1 wherein the stabilizer is added at a level which is within the range of 0.25 phr to 5 phr.

18. The method of claim 1 wherein the stabilizer is added at a level which is within the range of 0.5 phr to 3 phr.

19. The method of claim 1 wherein the stabilizer is a vulcanization retarder.

20. The method of claim 1, further comprising aging the blended mixture prior to step (2).

* * * * *